Aug. 13, 1957  R. C. DU BOIS  2,802,485
VISCOUS DAMPING DEVICE
Filed Sept. 10, 1953  2 Sheets-Sheet 1

INVENTOR.
ROBERT C. Du BOIS
BY
ATTORNEY.

Aug. 13, 1957  R. C. DU BOIS  2,802,485
VISCOUS DAMPING DEVICE
Filed Sept. 10, 1953  2 Sheets-Sheet 2
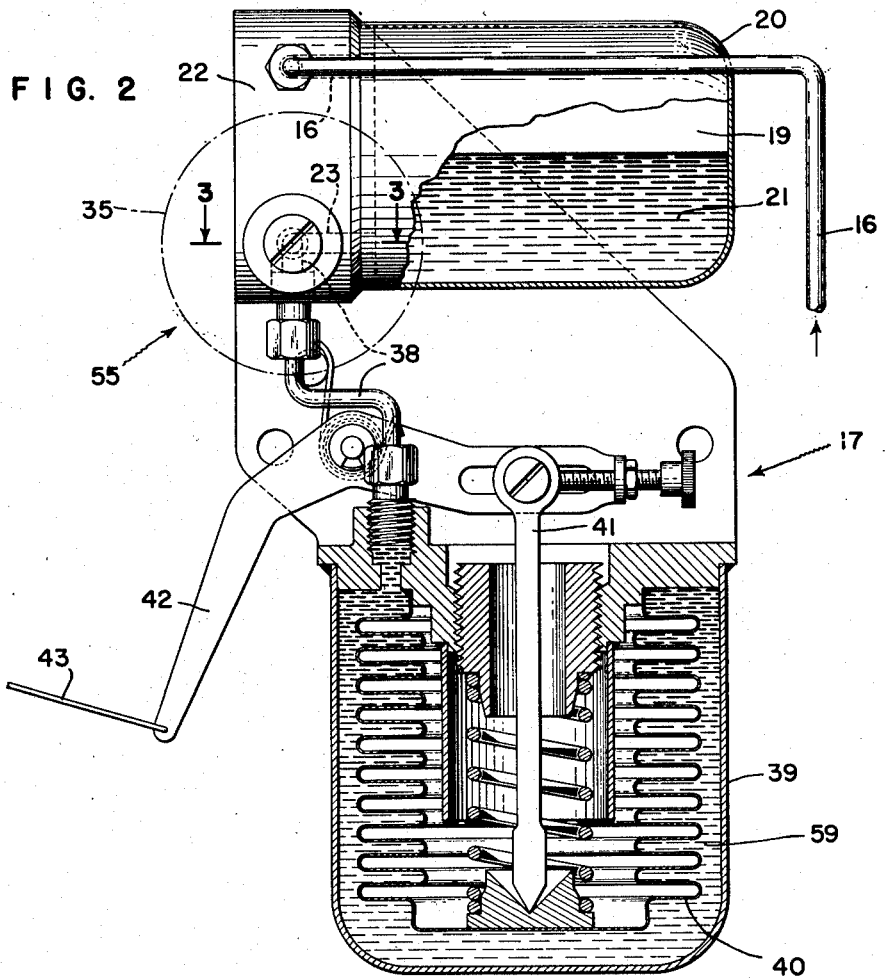
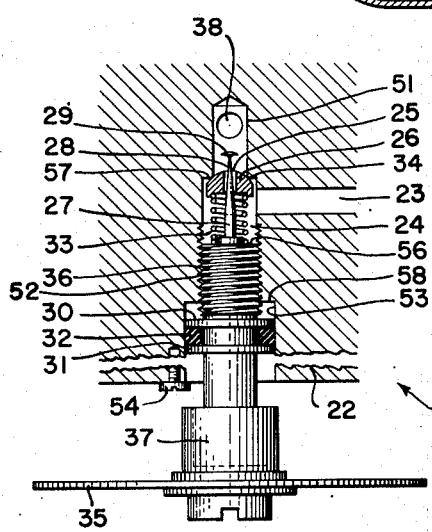
INVENTOR.
ROBERT C. DU BOIS
BY
ATTORNEY.

United States Patent Office 2,802,485
Patented Aug. 13, 1957

2,802,485

VISCOUS DAMPING DEVICE

Robert C. Du Bois, Philadelphia, Pa., assignor to Minneapolis-Honeywell Regulator Company, Minneapolis, Minn., a corporation of Delaware Application September 10, 1953, Serial No. 379,367

2 Claims. (Cl. 138—46)

The general object of the present invention is to provide apparatus for damping unwanted oscillations in a pneumatic transmission apparatus. More specifically, the present invention is devised and is well suited for apparatus in which a transmitter is employed to transmit a pressure to any type of receiving instrument, such as an indicator, recorder, or controller, which pressure varies in accordance with the magnitude of a variable.

In many types of pneumatic transmitting and receiving apparatus, unwanted oscillations frequently appear in the transmission lines which, if allowed to act in the receiving apparatus, will cause oscillation of parts of such apparatus as a recording pen in the receiver. Such oscillation of a recording pen will cause the pen to produce a record which is difficult to read and which is an inaccurate indication of the variable acting on the transmitter. If the receiving apparatus is also used as a controller, the controlling action thereof will not be smooth and accurate as is to be desired.

In accordance with the present invention, a satisfactory damping means may be formed by placing a restriction and a capacity in series in the pneumatic input line to the receiver. Such a damping means should be readily adjustable and arranged so that its damping action may be eliminated. Further, such damping means should be serviceable over long periods of time with a minimum of maintenance and inspection.

A more specific object of this invention is to eliminate adverse frequency ripples or oscillations in a pneumatic transmission system which cause the pen at the recording controller to produce a wiggling or oscillating motion.

Another object of this invention is to provide a liquid damping system for a pneumatic receiver apparatus, which system eliminates the possibility of clogging with dirt particles which are generally prevalent in an air type damping means or restriction.

Still a further object of the invention is to provide a damping means including a spring biased restrictor means which, when once set to the desired opening, will not have to be repositioned when any sudden surge in the received pressure occurs.

Still another object of the invention is to provide an adjustable restriction which will provide a medium to high degree of damping when turned in one direction, and a medium to zero degree of damping when turned in the opposite direction.

A still more specific object of the present invention is to provide a viscous damping means between a differential pressure measuring and transmitting device such as a mercuryless flow transmitter, disclosed in patent application Serial Number 248,358 filed September 26, 1951, of which the applicant is a co-inventor, and a standard recording flow controller and thus prevent any oscillation or wiggling motion from occurring at the recording pen.

The various features of novelty which characterize this invention are pointed out with particularity in the claims annexed to and forming a part of this specification. For a better understanding of the invention, however, its advantages and specific objects obtained with its use, reference should be had to the accompanying drawings and descriptive matter in which is illustrated and described a preferred embodiment of the invention.

In the drawings:

Fig. 2 is an elevation view showing a more detailed arrangement of the viscous damping unit employed in the control system shown in Fig. 1; and Fig. 3 is a sectional view taken along the line 3—3 in Fig. 2 illustrating a preferred embodiment of a needle restrictor employed in the damping unit.

Figure 1:
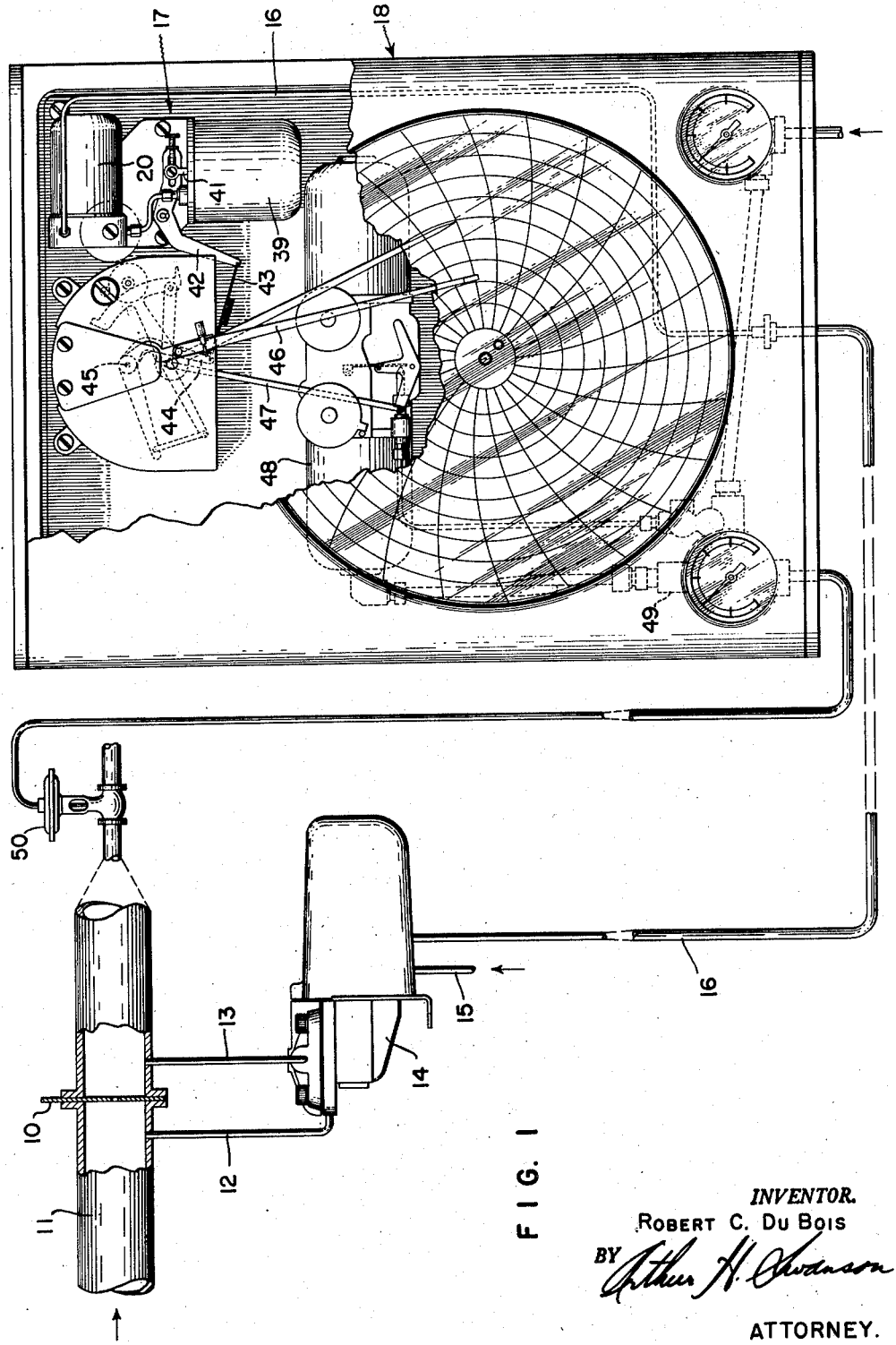
Fig. 1 is a somewhat diagrammatic representation of a typical control system which could make use of the viscous damping means disclosed in this application.

The selected form of the invention as diagrammatically illustrated in Fig. 1 shows the damping means described supra being made use of in an apparatus for measuring and recording a fluid flow and for producing control effects varying as the flow varies. In the operation of this apparatus the pressures at the high and low sides of an orifice plate 10 in a conduit 11, which differ from one another due to the flow through the conduit in the direction of the arrow, are each transmitted by pipes 12 and 13 respectively to a pneumatic transmitter such as the differential pressure transmitter 14. Air supply is fed to the transmitter 14 through the pipe 15 in the direction of the arrow.

The transmitter maintains an air pressure, which varies as the flow through the conduit 11 varies, and which is transmitted by the conduit 16 to a damping unit 17 located in a conventional flow controller 18. As better illustrated in Figs. 2 and 3 the air pressure from the transmitter is then fed to an air chamber portion or capacity 19 of a partially filled fluid reservoir 20. Any increase in the pressure transmitted to the top of the fluid 21 in the reservoir will force the reservoir liquid 21 to flow through the passageways 23, 24, in the embossed portion 22 of reservoir 20, the restricted passage formed between a tapered portion of the needle restriction 28 and the bore 25 of a tapered collar or a plug 26 as shown, a hollow cylindrical portion 51, conduit 38 to the chamber 59 between the well 39 and bellows 40. This increase in liquid pressure is then converted into mechanical pen movement in a conventional manner through the bellows 40, bellows rod 41, crank 42, overtravel link 43, actuating arm 44, pen shaft 45 and pen 46. This mechanical movement is also utilized in many control problems, as is done in the instant application, to move a differential linkage 47 of a pneumatic controller 48 which in turn regulates the control pressure being transmitted by a pilot valve 49 to the head of a control valve 50 to control the flow through a conduit 11.

In Fig. 3 there is shown a restricting means 55 which will assist the capacity 19 to dampen out any oscillatory motion being transmited by the fluid 21 to the recording pen 46 and differential linkage 47 of the controller 48. This restricting means 55 is comprised of a rotatable dial 35 fixedly attached to a shaft 37, a fluid seal 32, and shoulders 30, 31 on shaft 37 surrounding the seal 32 and slidably mounted for longitudinal movement in the cylindrical portion 53 between a removable stop 54 and the shoulder 58. Also included is a screw threaded portion 36 fixedly attached to shoulder 30 and threadedly engaged with threads on the cylindrical portion 52 to facilitate movement of the restricting means 55 in an inward and outward direction. A restrictor needle comprised of a cylindrical portion 27 integral with and protruding from the inner end of the threaded portion 36. This cylindrical portion extends a short distance from the threaded portion 36 and is tapered to a small cross section at 28. A protuberance 29 is formed on the inner end of the tapered portion. A plug 26, having an inner bore 25 of greater diameter than the diameter of the cylindrical portion 27, is slidably mounted on the cylindrical and tapered needle portions 27, 28. With this arrangement the opening of the passage between the bore 25 and the tapered portion 28 decreases in area as the tapered portion 28 of the restricting means 55 is rotated in an inward direction. This arrangement also provides a passage 25 of increasing area as the tapered portion 28 is moved in an outward direction. The protuberance 29 is shown in Fig. 3 as having a greater diameter than the bore 25 in order to move the plug 26 clear of passage 23 when the dial 35 of the restricting means 55 is rotated to an extreme outer position. A biasing means such as a spring 33 is shown between the inner end 56 of the screw threaded portion 36 and the plug 26 surrounding the restrictor needle portions 27, 28. This biasing means 33 keeps the plug 26 engaged with the annular seat or shoulder 34 during normal damping operation and forces the inner end of the plug 26 against the protuberance as the dial 35 is rotated to the extreme or non-restricted outermost position.

During a normal damping operation as shown in Fig. 3, the operation need only rotate the dial to the desired outwardly displaced position that will dampen out any unwanted oscillations being transmitted by the liquid flowing through the passage between the tapered needle portion 28 and the inner peripheral portion 57 of the plug 26. To enable the operator to determine when he has reached a desired outwardly displaced position the dial 35 can be calibrated in any conventional manner. In the apparatus shown a maximum of two complete revolutions of the dial 35 will enable the operator to go from the innermost or fully dampened position to the outermost or minimum dampened position. As this latter position is approached the protuberance 29 will be brought closer to but still out of contact with the inner end of plug 26.

If it is desired to operate this damping device so that the fluid fed from the reservoir will pass unrestricted through passageways 23, 24, 51 in lieu of passing through the space in passage 25 between the inside diameter of the plug 26 and the restrictor needle portion 27, 28 it is only necessary for the operator to turn the dial 35 in an outward direction until it is prevented from further movement by stop 54. During this movement the protuberance 29 on the tapered end 28 of the needle restrictor is brought into contact with and moves the plug 26 away from the shoulder 34 clear of the passage 23. In this latter mentioned position a completely unrestricted flow of fluid can be transmitted from the reservoir through the passages 23 and 24 to passage 38.

In view of the description noted supra it can be thus realized that this invention provides a novel means of damping out any undesirable frequency ripples and thus effect a smooth non-oscillatory pen motion despite changes in magnitude of the variable being measured.

While, in accordance with the provisions of the statutes, I have illustrated and described the best form of the invention now known to me, it will be apparent to those skilled in the art that changes may be made in the form of the apparatus disclosed without departing from the spirit of the invention as set forth in the appended claims, and that in some cases certain features of the invention may sometimes be used to advantage without a corresponding use of other features.

Having now described my invention, what I claim as new and desire to secure by Letters Patent is as follows:

1. A restrictor to dampen frequency ripples in the liquid branch of a fluid pressure line comprising, a hollow cylinder having three hollow cylindrical portions, said first portion of said three portions having an inlet port connected to said liquid branch, said second portion of said three portions being of larger internal diameter than said first of said portions and having one end thereof communicating with said first portion, said second portion having an outlet port adjacent one of its ends and internal threads adjacent its other end, the third portion of said three portions being of larger internal diameter than said second portion and communicating at one end with the internally threaded end of said second portion, a rotatable shaft to control the rate of flow between said inlet and outlet comprising a threaded portion engaging said internal threads, an integral tapered needle part extending from said threaded portion into the region where said second portion communicates with said first portion, means in said third portion slidably sealing a space between a non-threaded portion of said shaft and said third cylindrical portion, a plug having a bore of greater diameter than and being slidably mounted on said needle part with said part extending through the said bore in said plug, said plug being large enough to substantially entirely occlude the communication between said first and second portions save through the bore in said plug, a biasing means interposed between the end of said threaded portion adjacent said tapered needle and said plug continuously urging said plug to occlude communication between said first and second portions, said tapered needle having a proturberance on the end thereof extending into said first portion, said protuberance being of a larger diameter than the bore of said plug, the arrangement being such that when the threaded portion of said rotatable shaft is moved towards said third portion the tapered needle part moves through said bore in said plug and the amount of motion of which the plug is capable being such that after a given amount of motion of said shaft toward said third portion the said protuberance will engage said plug and carry it into said second portion to permit free communication between said first and second portions.

2. A restricting means for damping out frequency ripples comprising a hollow valve body having three stepped and progressively increasing hollow diametral portions therein, a fluid inlet in said portion having the smallest internal diameter, an outlet in said next largest portion, a hollow externally tapered plug, a biasing means normally biased in a direction to seat said tapered portion of said plug against said valve body part forming the step between the said two portions having the said smallest and next largest internal diameter, a manually rotatable pin mounted in said valve body and extending through said smallest diametral end portion of said tapered plug having a diametral portion slightly smaller than the hollow portion of said plug and an extended tapered end portion, a protuberance attached to the end of said tapered end portion which is of greater diameter than said hollow portion of said plug, means between said pin and the second largest of said hollow diametral portions and protruding through a central portion of said largest of said diametral portions to enable said tapered end of said pin to be moved relative to said plug and adjust the restrictive opening between said inlet and outlet, a seal between said pin moving means and said largest of said portions of said valve body, said tapered plug being gradually moved away from its seated position as said protuberance on said pin is adjusted by said last mentioned means in a direction toward said third hollow diametral portion.

References Cited in the file of this patent

UNITED STATES PATENTS

| | | |
|---|---|---|
| 2,398,855 | Ray | Apr. 23, 1946 |
| 2,466,071 | Barnes et al. | Apr. 5, 1949 |
| 2,603,092 | Buffenmyer | July 15, 1952 |
| 2,651,327 | Larkin | Sept. 8, 1953 |
| 2,690,757 | Orchowski | Oct. 5, 1954 |

FOREIGN PATENTS

| | | |
|---|---|---|
| 641,127 | Great Britain | Aug. 2, 1950 |